(12) United States Patent
Leonard et al.

(10) Patent No.: US 10,019,773 B2
(45) Date of Patent: *Jul. 10, 2018

(54) AUTHENTICATION AND VALIDATION OF SMARTPHONE IMAGERY

(71) Applicant: Tautachrome, Inc., Oro Valley, AZ (US)

(72) Inventors: Jon N. Leonard, Oro Valley, AZ (US); Matthew W. Staker, Coto de Caza, CA (US); Robert P. Gille, Tucson, AZ (US); Joel C. Sercel, Lake View Terrace, CA (US); Jeffery S. Davis, Oro Valley, AZ (US)

(73) Assignee: TAUTACHROME, INC., Oro Valley, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,051

(22) Filed: Dec. 28, 2016

(65) Prior Publication Data

US 2017/0140492 A1 May 18, 2017

Related U.S. Application Data

(63) Continuation of application No. 13/971,527, filed on Aug. 20, 2013, now Pat. No. 9,582,843.
(Continued)

(51) Int. Cl.
*G06T 1/00* (2006.01)
*H04N 1/32* (2006.01)

(52) U.S. Cl.
CPC ....... *G06T 1/0042* (2013.01); *H04N 1/32331* (2013.01); *H04N 2201/3214* (2013.01);
(Continued)

(58) Field of Classification Search
CPC ....... G06T 1/005; G06T 1/00; H04N 5/23258; H04N 1/00106; H04N 1/00119;
(Continued)

(56) References Cited

U.S. PATENT DOCUMENTS

| 5,499,294 A | * | 3/1996 | Friedman | ............... G07D 7/004 348/207.99 |
| 5,799,082 A | | 8/1998 | Murphy et al. | |

(Continued)

FOREIGN PATENT DOCUMENTS

| WO | WO0251126 A2 | 6/2002 |
| WO | WO2012162467 A1 | 11/2012 |

OTHER PUBLICATIONS

Evidence Pix Company Information, http://www.evidencepix.com/company.html (Dec. 2012).

*Primary Examiner* — Abu Sholeman
(74) *Attorney, Agent, or Firm* — Bacon & Thomas, PLLC

(57) ABSTRACT

A method, system, and processor-executable software for processing images or video captured by a smartphone or other digital image capture device for subsequent validation and authentication captures not only the image, but also metadata relevant to the authenticity of validity of the image, such as position, time, camera movement and orientation, image parameters, and so forth. The image is watermarked and both the watermarked image and the metadata, as well as a symmetric key used in the watermarking, are digitally signed and transmitted or uploaded to a web server or authentication centric entity for authentication and storage. When a third party submits an image to the web server or authentication centric entity, the submitted image is compared with the stored watermarked image for authentication and validation of the submitted image, and the metadata is then retrieved to enable analysis of the contents of authenticated and validated image.

17 Claims, 3 Drawing Sheets

Related U.S. Application Data

(60) Provisional application No. 61/691,096, filed on Aug. 20, 2012.

(52) U.S. Cl.
CPC ............... *H04N 2201/3215* (2013.01); *H04N 2201/3252* (2013.01); *H04N 2201/3254* (2013.01); *H04N 2201/3281* (2013.01)

(58) Field of Classification Search
CPC .. H04N 1/32272; H04N 5/44; H04N 5/23222; H04N 2201/3281; H04N 2201/3253; H04N 2201/3252; H04N 2201/3236; H04N 2201/3235; H04N 1/32; H04W 48/16; H04M 1/32331
USPC ...................................... 713/1, 176
See application file for complete search history.

(56) References Cited

U.S. PATENT DOCUMENTS

| | | | | |
|---|---|---|---|---|
| 5,862,218 A | * | 1/1999 | Steinberg | G06T 1/0028 348/231.3 |
| 6,005,936 A | * | 12/1999 | Shimizu | G06T 1/0028 380/200 |
| 6,275,599 B1 | * | 8/2001 | Adler | G06T 1/0042 382/100 |
| 6,658,135 B1 | * | 12/2003 | Morito | G06T 1/0021 358/3.28 |
| 6,754,822 B1 | * | 6/2004 | Zhao | G06F 21/10 713/176 |
| 6,792,128 B1 | * | 9/2004 | Nguyen | G06T 1/0064 382/100 |
| 7,146,479 B2 | | 12/2006 | Li et al. | |
| 7,161,479 B2 | | 1/2007 | Sobol | |
| 7,165,718 B2 | * | 1/2007 | Blancas | G06Q 20/02 235/375 |
| 7,207,480 B1 | | 4/2007 | Geddes | |
| 7,305,089 B2 | * | 12/2007 | Morikawa | H04N 1/32128 380/210 |
| 7,535,352 B2 | | 5/2009 | Sobol | |
| 7,925,882 B2 | * | 4/2011 | Hirano | G06Q 30/02 713/176 |
| 8,107,668 B2 | * | 1/2012 | Lowe | H04N 1/32144 380/201 |
| 8,243,981 B2 | * | 8/2012 | Zandifar | G06T 1/0028 382/100 |
| 9,300,678 B1 | | 3/2016 | Stack | G06F 21/6218 |
| 2003/0097568 A1 | * | 5/2003 | Choi | G06T 1/0042 713/176 |
| 2003/0123701 A1 | * | 7/2003 | Dorrell | G06F 21/64 382/100 |
| 2003/0163684 A1 | * | 8/2003 | Fransdonk | G06Q 20/12 713/153 |
| 2003/0167392 A1 | * | 9/2003 | Fransdonk | G06F 21/10 713/156 |
| 2003/0196086 A1 | * | 10/2003 | Murakami | H04N 1/32122 713/161 |
| 2003/0226023 A1 | * | 12/2003 | Peters | G11B 20/00086 713/193 |
| 2004/0071311 A1 | * | 4/2004 | Choi | G06T 1/0071 382/100 |
| 2004/0218053 A1 | * | 11/2004 | Wakao | H04N 1/00925 348/207.99 |
| 2004/0258274 A1 | * | 12/2004 | Brundage | G07D 7/128 382/100 |
| 2006/0242418 A1 | * | 10/2006 | Willamowski | G06T 1/0071 713/176 |
| 2007/0021843 A1 | * | 1/2007 | Neill | G06F 21/72 700/1 |
| 2008/0089554 A1 | * | 4/2008 | Tabankin | G06T 1/0021 382/100 |
| 2008/0184272 A1 | * | 7/2008 | Brownewell | G06Q 10/10 719/318 |
| 2008/0199040 A1 | * | 8/2008 | Jonsson | H04N 1/32149 382/100 |
| 2008/0301464 A1 | * | 12/2008 | Parkinson | H04L 9/3247 713/186 |
| 2009/0049004 A1 | * | 2/2009 | Nurminen | G06F 17/30265 |
| 2009/0067666 A1 | * | 3/2009 | Zhao | G06K 9/6202 382/100 |
| 2009/0141931 A1 | * | 6/2009 | Yadid-Pecht | G06T 1/0035 382/100 |
| 2010/0297939 A1 | * | 11/2010 | Fujita | H04W 4/00 455/41.1 |
| 2011/0038594 A1 | * | 2/2011 | Symons | G11B 20/00086 386/224 |
| 2011/0055585 A1 | * | 3/2011 | Lee | H04L 9/0844 713/183 |
| 2011/0243458 A1 | * | 10/2011 | Yoshioka | G06T 1/0021 382/209 |
| 2012/0044358 A1 | * | 2/2012 | Thomason | H04N 1/00204 348/175 |
| 2013/0163888 A1 | * | 6/2013 | Montalvo | G06K 9/627 382/225 |
| 2014/0279493 A1 | * | 9/2014 | Kamath | H04L 63/08 705/43 |
| 2015/0215492 A1 | * | 7/2015 | De Vuono | H04N 1/32144 382/100 |
| 2015/0234861 A1 | * | 8/2015 | Kojima | G06F 17/30247 382/190 |
| 2016/0085994 A1 | * | 3/2016 | Pereira | G06F 21/6272 726/26 |

* cited by examiner

AUTHENTICATION AND VALIDATION OF SMARTPHONE IMAGERY

This application is a continuation of U.S. patent application Ser. No. 13/971,527, filed Aug. 20, 2013, which claims the benefit of U.S. Provisional Application Ser. No. 61/691,096, filed Aug. 20, 2012.

BACKGROUND OF THE INVENTION

1. Field of the Invention

This invention relates to a method, system, and processor-executed software for authenticating and validating still images and videos (imagery) captured by a smartphone or other digital camera device. The method not only enables detection of image tampering, but also enables verification of the time the image was taken, its location, and other information that may be used to determine the authenticity and validity of the imagery.

The method involves using metadata associated with the image capture to authenticate and verify the images and videos, and protection of the metadata by public/private key encryption. The metadata may include not only time and date, but also other data such as camera settings (aperture, shutter speed, focal length, and so forth), camera orientation and movement data, and context information such as sounds or words captured contemporaneously with the imagery, the direction in which the image is taken, and signals from nearby cell towers or WiFi hotspots.

The imagery itself is watermarked with a unique identifier that is embedded in the image using a symmetric key generated by the smartphone or other camera device, and the watermarked image, metadata, and symmetric key are digitally signed and uploaded or transmitted to a central authentication and verification service for storage in a database upon authentication of the digital signatures of the watermarked imagery, metadata, and symmetric key. The central authentication and verification service, which may be a cloud based service, enables third parties to authenticate and verify submitted imagery that corresponds to imagery stored in the authentication database.

2. Description of Related Art

Currently cell phone cameras are ideal for capturing images and video on a moment's notice, at the drop of a hat, any place, any time. Their revolutionary ubiquity also puts cell phone cameras everywhere all the time. However, although cell phone imagery can ignite wide interest, the validity of cell phone imagery is subject to uncertainty owing to the potential for losing the ground truth of the image, its time of capture or its place of capture as a result of deliberate image, time or GPS doctoring or subsequent image, time or GPS mishandling or misadventure. A realistic video of Sasquatch or the Loch Ness Monster can be created inside a 16-year-old's bedroom in Queens, N.Y., and yet find its way to a popular news website. A video of a candidate's speech can be altered by an opponent's campaign staff. Alien creatures can find their way into images purporting to be transmitted by the Mars rovers. For this reason, the usage of cell phone images or video to ascertain ground truth is limited. While cell phone images and video have great value for enjoyment, they have much more limited value as legal evidence, detective information, or scientific data.

Nevertheless, the very ubiquity of cell phone imagery opens an enormous opportunity to gather valid information on all matters of human interest, on an unprecedented scale. If such imagery could be captured in such a way as to enable anyone viewing the imagery to authenticate and validate the imagery, the value of the imagery would be substantially increased.

It has long been known to encrypt at least portions of electronic documents in order to authenticate the source of the images, and enable detection that the document has been tampered with. However, such techniques are not adequate to authenticate digital imagery captured by portable devices such as smartphones. In the case of imagery, it is not sufficient merely to authenticate the source of the imagery, or that the image has been tampered with after creation. One needs to know how the imagery was created, and the circumstances of its creation. For example, one might wish to know whether a picture of the Loch Ness monster was actually captured from a moving boat in outdoor light.

Furthermore, whereas the authenticity of a document is primarily of interest to the recipient of the document or a limited group of persons affected by the document and who can be given keys to authenticate the document, the authenticity and/or validity of an image captured by a smartphone camera may be of interest to a much larger audience with access only to the imagery itself, and not associated data necessary for authentication and validation.

These problems have only been addressed in parts. Both digital image watermarking and image authentication techniques have previously been proposed, but these techniques do not address the underlying truth of the imagery, i.e., whether the imagery actually shows what it purports to show, and are generally unsuitable for implementation on a mass scale, i.e., by the vast numbers of ordinary smartphone or digital camera device users, and even larger numbers of person who might have subsequent access through the Internet to the imagery captured by the smartphones or digital camera devices.

An example of a prior image authentication method is found in U.S. Pat. No. 6,005,936, which discloses a digital camera that generates authentication information data from a first region of the image, encrypts the authentication information data from the first region and embeds it in the second region. Tampering can be detected by recovering and decrypting the embedded authentication information data from the second region and comparing the decrypted authentication data with the original authentication data in the first region. This method allows detection of image alterations. However, it does not authenticate the original image, i.e., it does not ensure that the original image is an image of what it purports to show, and that it was taken at its apparent location and at the time it appears to be taken.

Another example of a prior image authentication method is the watermarking technique is disclosed in U.S. Pat. No. 8,107,668, which also involves embedding information in the imagery, but which embeds the information of watermark throughout the imagery in a way that that is difficult or impossible to detect (known as staganographically embedding), thereby increasing the robustness of the watermarking by increasing the difficulty of tampering while at the same time enabling dissemination of the watermarked image. Again, however, this patent does not address underlying issues involving verification of image content or context, or of providing an integrated system that enables implementation on a mass scale, i.e., by the general smartphone-owning and Internet-image viewing public.

Finally, a company called EvidencePix Systems, Inc. has proposed a system that provide secure transmission of images, but limited to the context of security systems that send intruder alerts to subscribers. The transmissions are in the form of encrypted digital images to which time and location are annotated, as described in U.S. Pat. Nos. 7,146, 479 and 7,535,352, but the system does not provide validation of the image capture process, and in particular the ability to verify that the time and date associated with an image are authentic and properly associated with the image, or a way for a general audience to access and authenticate/validate the images.

SUMMARY OF THE INVENTION

It is accordingly a first objective of the invention to provide a system, method, and software executable by a smartphone or digital camera device for authenticating and validating imagery.

It is a second objective of the invention to provide a method, system, and software executed by a smartphone or digital camera device that permits the smartphone or digital camera device to produce completely authenticable imagery, i.e., imagery that can be readily and irrefutably authenticated as being the original un-retouched, untampered, unspoofed camera-produced imagery by anyone viewing the imagery at a later date on any other device or in any other format.

The present invention is, in a preferred embodiment, implemented as a cell phone or smartphone "app" presented in the usual cell phone friendly manner (for example as a one click camera-like icon that can be used in place of the phone's usual camera icon) that is able to:

Take command of the phone's camera under user specified conditions;
Capture (and optionally encrypt) the cell camera's native imagery and/or video;
Watermark the capture native imagery and/or vide;
Capture and (and optionally encrypt) the cell phone's concurrent GPS and time information, or other location and time information, in the same file with the imagery or video;
Capture additional information about the context and circumstances of image capture, such as camera settings and movement, as well as other information, in the file with the imagery or video;
Securely transmit the watermarked imagery and other captured information to a server system or "authentication centric entity" in such a way as to permit authentication;
Record imagery in the cell phone memory;
Preserve the watermarked imagery and other information on the server system to serve as a protected record of the authentic imagery for later comparison to versions of the imagery submitted by third parties for authentication and validation; such authentication and validation may be especially useful in contexts requiring careful investigation, such as a courtroom, a science lab, or a detective's office where it is essential to validate the untampered, undamaged state of the imagery in use, although the method and system of the invention is not limited to any particular context, or to any specific reason for desiring authentication, validation, or verification of the submitted imagery.

More generally, the objectives of the invention are accomplished by providing a method of processing captured images for subsequent validation and authentication that involves capturing metadata at the time of image capture, using a random symmetric key to embed the watermark in the image, preferably by embedding the watermark throughout the image in such a way that the watermark can survive further processing such as compression and decompression of the image, and sending the metadata together with the watermarked image and symmetric key in authenticatable form to a server system or authentication centric entity for authentication and storage.

An especially advantageous feature of the invention is the use of an extended set of metadata to provide for improved validation of the imagery. The metadata may include any or all of the following: A. position obtained from GPS and/or other location determining sensors or the communications network; B. date and time taken from the cell network, from the GPS satellite data, from NIST's FM signal, from any of several internet sites, or if no connectivity is available to access these services, then from the smartphone's internal clock; C. camera orientation obtained from live gyro data and live accelerometer data D. smartphone velocity and/or direction of movement, again derived from gyro or acceleration data, E. shake, rattle and roll, i.e., the high frequency movements arising from jostling, handling or even dropping the device. F. audio G. network tower and nearby WiFi identification H. Exif (Exchangeable Image File Format)-like data consisting of camera identification information, imaging settings, and image processing information that characterizes the imagery that is collected during the imaging action, or corresponding data for video; and/or I. system state and processes record, to ensure that the system is operating as it should and is not malfunctioning or has not been tampered with.

Those skilled in the art will appreciate that the specific medium through which the images are transmitted is not a part of the invention, and may include an Internet connection, direct transmission through a wired or wireless network, or any other communications medium. The information transmitted may include the watermarked image, the symmetric key, the original metadata, and corresponding digital signatures for authenticating the watermarked image, the symmetric key, and the original metadata.

Once the uploaded information has been verified and stored on the server system or otherwise stored by the authentication centric entity, the watermarked image may distributed directly or via a social network to specified recipients, or to an imagery viewing website accessible to the general public, after which any party can submit a copy of the watermarked image to the server system or authentication centric entity for authentication and validation. The authentication and validation procedure involves:

a. retrieving the original watermarked image based on an included reference number, searching for a matching watermarked image, and/or optionally analyzing the submitted image to determine if differences between the submitted image and stored watermarked image are indicative of permissible alterations such as scaling or cropping; and
b. if a stored watermarked version of the submitted image exists, retrieving the corresponding stored and authenticated metadata and then making the metadata available for analysis.

Once the metadata is made available, the authenticated time, date, and other image data may be analyzed to determine if there are any inconsistencies between this metadata and what the image purports to show.

It is assumed for purposes of the present invention that the software included in the smartphone or digital camera device is authentic and unaltered or spoofed, i.e., trusted code. It is very critical that any software used to carry out the steps of the preferred method be secured at every step from creation to installation. However, technology for authenticating and protecting software is known and is not part of the presented invention. In addition, the invention involves public/private key cryptography, or other encryption techniques, which are known and do not in themselves form a part of the present invention.

The method may be implemented using processor-executed software installed on a device with a conventional operating system or platform such as Android OS or Apple iOS, but is not limited to any particular operating system or smartphone/digital still camera/or video capture device, so long as the device has the capability of performing the necessary encryption and watermarking steps, and of collecting or generating metadata for use in the image capture and processing described herein.

DETAILED DESCRIPTION OF THE PREFERRED EMBODIMENTS

The method of the invention is implemented in a smartphone, digital camera, or any other device with image capture and communications capabilities, and that is capable of being programmed to carry out the steps of the method. For convenience, the device will be referred to as a smartphone, which term is intended to include all types of portable device with image capture and communications capabilities. The programming may be built-into the smartphone, either as pre-loaded software or, at least in part, programmed hardware such as EEPROMs or circuitry, or the programming may be downloaded to the smartphone from an external source in the form of, for example, an "applet" or "app" available from an external source such as a webserver or app store. If downloaded from an external source, it is especially important to ensure that steps be taken to protect the software itself so that it cannot be altered, i.e., is in the form of "trusted code." The method described herein assumes that the control program for implementing the method of the invention is trusted code.

Figure 1:
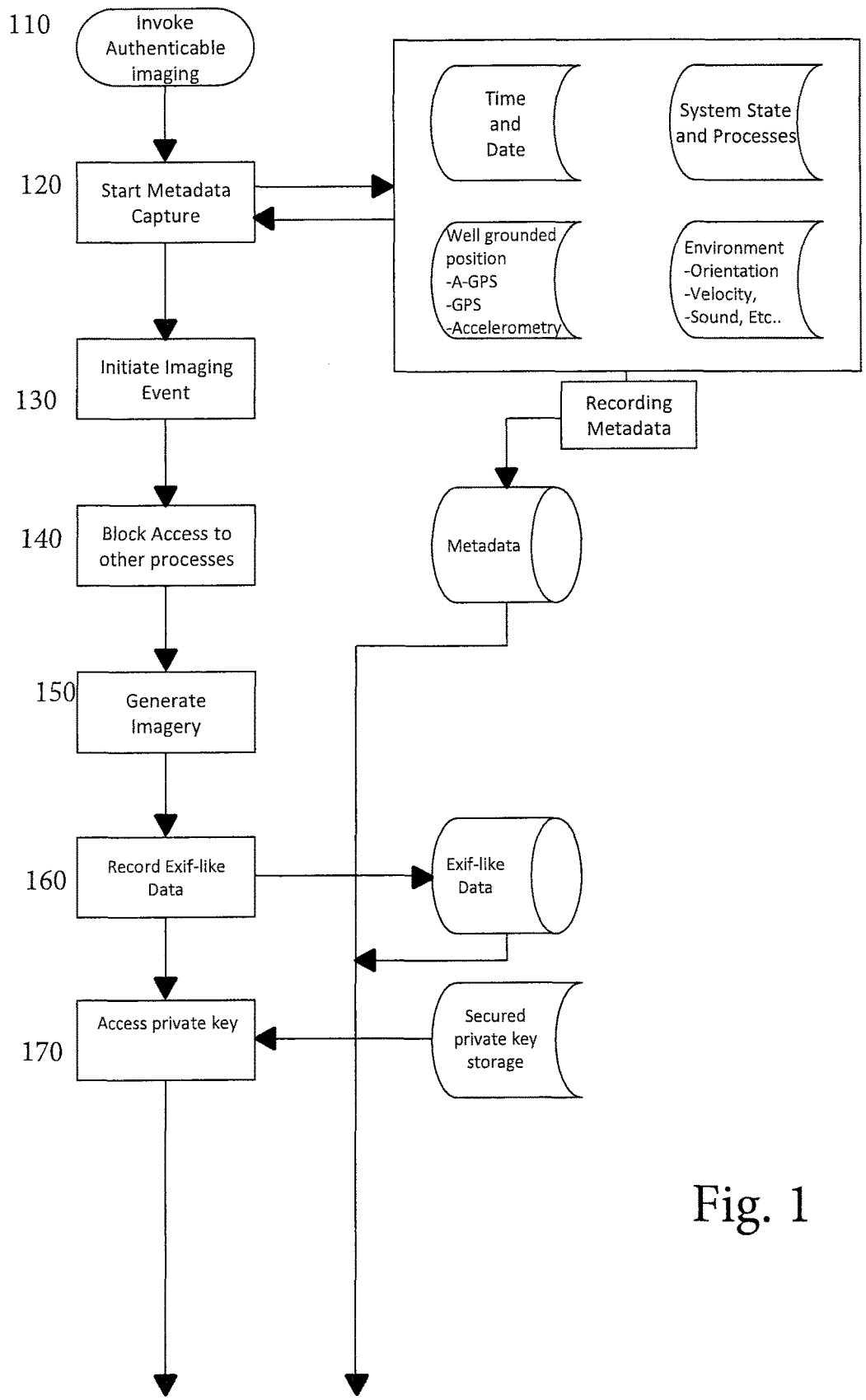
FIG. 1 is a flowchart illustrating the method of the preferred embodiment of the invention.

As illustrated in FIG. 1, the method begins in step 110 when the user wishes to subject imagery, either in the form of a still image or video, to authentication and validation processing using the method of the invention, for example by selecting and opening the program or processor-executed software from a menu or screen of the smartphone and, optionally, inputting a password.

In step 120, the program captures metadata associated with the imagery. The more different types of metadata captured, the greater the confidence will be in subsequent image validation, and therefore the following list of metadata that the program may be designed to capture, or that may be available to the program for optional or selective capture, is not intended to be exhaustive. Instead, the term "metadata" as used herein is intended to encompass all possible data that may be captured at the time of image capture and that is potentially relevant to the authenticity of validity of the captured imagery, including any or all of the following:

A. Position:

Inputs for position computation are the standalone GPS position information coming from the smartphone's GPS antenna and chipset, assisted GPS data (A-GPS data) from the cellular network servers giving current satellite ephemeris and time information directly to the smartphone via the cellular network or via a WiFi connection, and data from the smartphone's accelerometers.

Because the GPS satellite data rate to the smartphone is low (50 bps), standalone GPS can take a long time to download the current GPS almanac and ephemeris data needed to get a first fix when the GPS has been off. The cellular network will substantially reduce this first fix time because it continuously downloads and can provide this current GPS almanac and ephemeris data directly to the smartphone.

The smartphone's accelerometers provide the instantaneous motion of the smartphone. This motion information enables the computation of the change in the smartphone's position with time. When GPS goes down, which it will from time to time owing to obstructions to the GPS signal from buildings, foliage and landscape, the accelerometers can re-compute position from the last known position until GPS comes back up.

Since the location where the imagery is captured will often be a critical part of the authenticability of the imagery, providing a "well-grounded" estimate of position is important, i.e., the estimate should be the most accurate measure of position over the largest portion of the time interval of the imaging action, as is possible for the smartphone to obtain.

Advanced estimation filter technologies have become available that are compact, speedy and able to use all available helpful information to compute optimal estimates of position and other physical parameters. The Exact Flow Particle Filter (EFPF)10 described in F. Daum, *"Exact Particle Flow for Nonlinear Filters," Proceedings of SPIE*, vol. 7697, pp. 769704-1 to 769704-19, is the newest and best of these, and may be used in the connection with the preferred embodiment.

B. Time

Date and time may be taken from the cell network, from the GPS satellite data, from NIST's FM signal, from any of several internet sites, or if no connectivity is available to access these services, then from the smartphone's internal clock that can accurately compute change of time since the last known time. Like position, the date and time that Imagery was taken can be a critical factor in the authenticability of imagery. The EFPF can be used to estimate the time. This is important when there is a disagreement between several sources of time, perhaps as a result of tampering inside the smartphone.

C. Camera Orientation

The live gyro data and live accelerometer data are used together to compute the camera's orientation, i.e., where the camera's lens is pointing, as a function of time. Computed orientation could be in the form of a table with the elevation and azimuth of the vector normal to the smartphone's face (or the vector normal to the back if with respect to the back facing camera's lens).

4. Smartphone Velocity

By knowing or calculating the position of the center of gravity (CG) of the smartphone, the live gyro data and live accelerometer data can also be used to compute the camera's velocity vector, that is the instantaneous direction of translation of the smartphone's CG, as a function of time. The velocity vector measures how the smartphone is translating through space. For a phone, movement is probably best understood in terms of speed, change in elevation if any, and change in azimuth (compass heading,) if any. Speed can be used to determine whether the user of the smartphone was stationary, moving on foot, moving at car speed, or flying during the time period of the imaging event.

5. Shake, Rattle and Roll

The "shake, rattle and roll" (SRR) of the smartphone is the set of high frequency movements arising from jostling, handling or even dropping the device. Like orientation and velocity, SRR is calculated from the live gyro and accelerometer data. The six elements that make up SRR and have to be calculated are the three rotational movements roll, pitch, and yaw, and the three translational movements X, Y and Z (the X-axis being the East-West axis, the Y-axis being the North-South axis, and the Z-axis being the up-down axis). The SRR spectrum is approximately the 0.2 to 1.0 Hertz range. From SRR one can determine such things as whether the user is running, walking, going up or down stairs or having a first fight during or around the imaging event.

6. Audio

When the authenticable imaging functionality is invoked, the metadata capture program may begin recording the audio pickup microphones' inputs. Both the noise cancelled processed audio streams, and the raw inputs may be recorded for the purpose of retaining both voice and non-voice information.

7. Network Tower and Nearby WiFi Identification

A file may be kept of the identification of the network towers the and the nearby WiFi transmitters that are identifiable by the smartphone.

8. Exif-Like Data

Exhangeable Image File Format (Exif)-like data consists of the camera identification information, imaging settings, and image processing information that characterizes the imagery that is collected during the imaging action. This information may include any or all of the image creation date, creation time, dimensions, exposure time, image quality or resolution, aperture, color mode, flash used, focal length, ISO equivalent, image format (e.g., jpeg) process, camera manufacturer, metering mode, camera model, and image orientation. A great deal more imaging action-specific information is available and can and should be compiled into the Exif-like data file. Inclusion of Exif-like data in the captured metadata is especially advantageous since the Exif-like data will also be apparent in authentic imagery submitted by a third party, and therefore can be compared with uploaded and stored Exif-like data as a further way to identify what, if any, changes have been made to the imagery.

9. System State and Processes Record

Evidence of the effectiveness of the authentication of imagery is in part the control of the processes that could interfere with, tamper with or spoof the validity of the imagery being produced. For this reason, a trusted record of the system state and processes has value.

The next listed step 130, which may occur before, during, or after metadata capture step 120, is the step of actually capturing the image. The manner in which the image is captured and stored, and/or the format of the image, forms no part of the invention. Numerous formats and image capture protocols are known and may be adapted for processing to achieve the authentication and validation features of the present invention.

Step 140, which again may occur before image or video capture and which continues throughout the remainder of the illustrated process performed by the smartphone, is to block access to other processes that would interfere with or affect the image processing steps described below.

Once the imagery is captured by imaging sensors in the smartphone, it is digitized and formatted in step 150 to generate the imagery. Again, the particular image format is not part of the present invention. Those skilled in the art will be able to adapt the method of the invention to different image formats, such as jpeg or tiff, by known image processing and/or encryption techniques.

The Exif data is illustrated as being recorded in step 160, separately from the metadata capture step 120. However, Exif data should be considered as part of the metadata that may be captured, and this step may be performed at any time that the data becomes available to the program.

Finally, as shown in FIG. 1, a private key is accessed in step 170. Step 170 may be performed at any time before the private key is needed for digital signature generation, as described below. The manner in which the private key is obtain, for example from the authentication centric entity to which the imagery will be uploaded after processing or a third party key server, and the specific nature of the key, is not a part of the present invention, and any known private key or key obtaining/storing method may be utilized.

Figure 2:
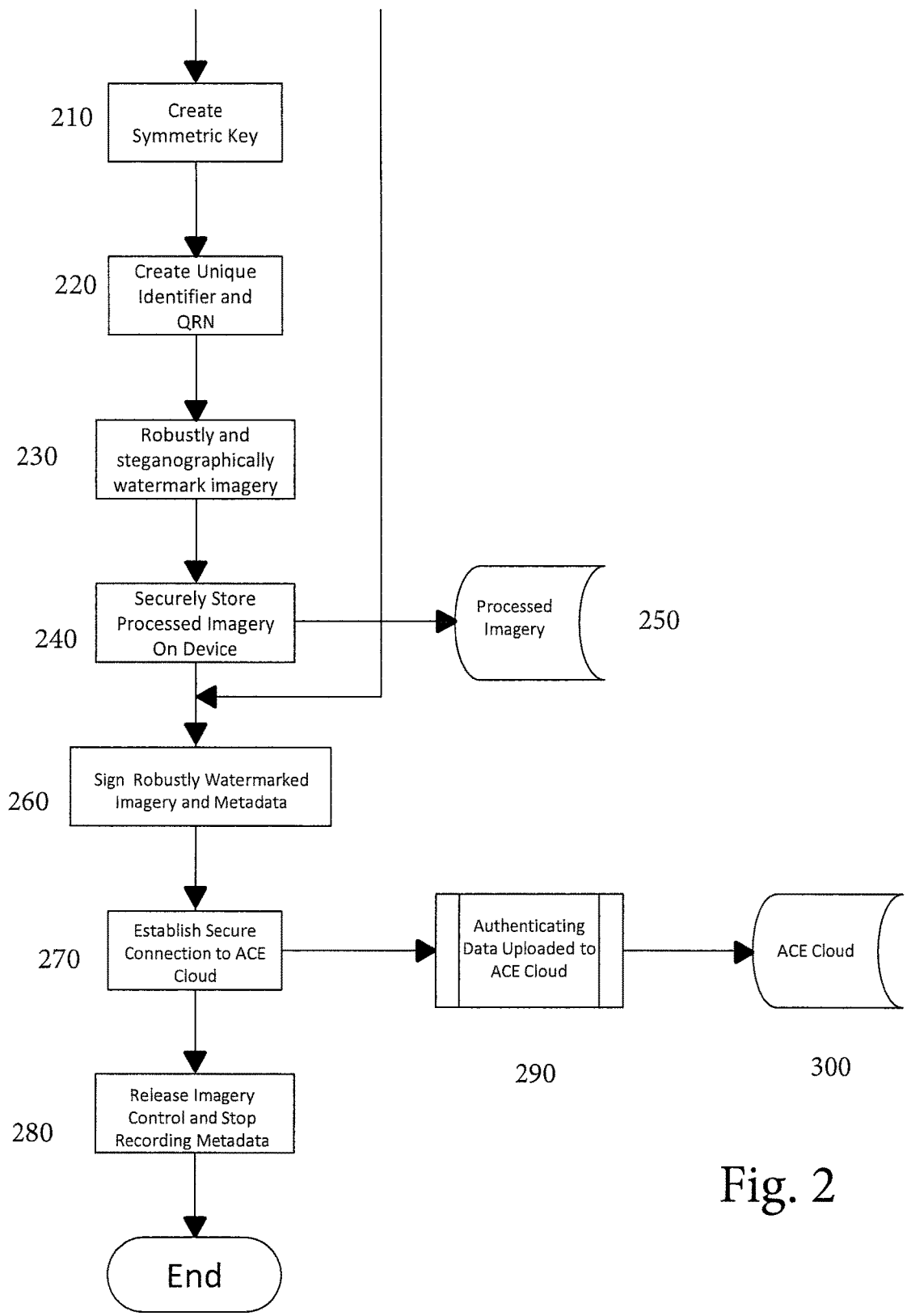
FIG. 2 is a continuation of the flowchart of FIG. 1.

As illustrated in FIG. 2, the method continues to the step 210 of creating a unique symmetric key for each imaging action, i.e., for each photo taken or image made. The unique symmetric key, also known as a session key, may be a random number by a random number generator or algorithm in the smartphone, or any number or value derived from a changing and/or arbitrary input or sensed value, or a combination thereof.

This symmetric key is then used in step 220 to create a unique identifier for the imagery, and the imagery then is "watermarked" with the unique identifier. The unique identifier may consist of the symmetric key itself, a concatenation of the symmetric key and other information, and/or a code or information (such as metadata) encrypted by the symmetric key, or the symmetric key may be used as part of a more involved process that embeds the unique identifier in the imagery. The symmetric key is saved for forwarding to the authentication centric entity together with the watermarked image and the original metadata, as described below. An example of a watermarking process that may be used to steganographically embed the unique identifier in the imagery is described in U.S. Pat. No. 8,107,668, although the manner in which the symmetric key is used to generate the unique identifier and/or embed the unique identifier/metadata in the imagery as a watermark may be varied without departing from the scope of the invention. For example, instead of embedding the unique identifier throughout the image, the unique identifier may be used as a key for finding a hidden watermark through the captured imagery.

A quick reference number (QRN) may also be assigned to the imagery in step 220 for easy tracking of particular imagery within the smartphone and after the imagery is uploaded to an authentication centric entity. The quick reference number may be hidden and/or applied in step 130 to watermark the image so that it can be used by the authentication centric entity as an additional validation code, or non-obfuscated and placed on a logo or other mark to identify the image to any third party as being protected by the method and system of the present invention and available for authentication and validation from the authentication centric entity based on the quick reference number.

The watermarked image may then be stored on the smartphone or other image capture device (step 140) for subsequent retrieval from a storage device 250, or immediately processed for uploading to the authentication centric entity.

In step 260, the watermarked image is digitally signed so that it can be authenticated by the authentication centric entity after transmission or uploading in step 170. The digital signature may, in the preferred embodiment, be obtained by encrypting the watermarked image or a portion thereof using the private key of a private/public key cryptosystem. This ensures that the image has been encrypted by a registered user whose identity is known to the authentication centric entity, as described below, because decryption can only be successfully carried out using the public key held by the authentication centric authority if the image was encrypted by a unique private key that corresponds to the public key. Numerous digital signature generating and authentication methods are known, and the invention is not intended to be limited to a particular form of public/private key encryption. In addition, encryption techniques other than private/public key encryption may be used to authenticate the image.

In addition to the digitally-signed watermarked digital imagery, the metadata and the symmetric key are digitally signed and sent to the authenticating centric entity so that the metadata can be authenticated and the symmetric key used to generate the QRN and recover the original image. The sending step is indicated as step 270, which preferably involves transmission or uploading of the signed encrypted image and associated information over a secured communications channel. Upon completion of the transmission or upload, the image capture and procedure on the smartphone or image capture device may be terminated, as indicated by step 280.

Prior to any upload, the user must be registered with the authentication centric server, so that the server will recognize the identity of the user and be able to associate the correct keys with the received image. The user may be identified by any combination of unique identification number of the user's device, a username password, and/or other user identifying data such as biometric identification data such as a finger or voice print. At the time of registration, or before any image capture using the method and system of the invention, a private key unique to the user must be supplied to the user and, if originating with a third party key server, a corresponding public key supplied to the authentication centric server. The authentication centric server may also store the private key of the user to handle situations of lost or stolen phones.

In step 290, upon reception of the signed image, metadata, and symmetric key, the authentication centric entity authenticates the received watermarked image, metadata, and symmetric key by decrypting the digital signatures using the public key corresponding to the sender's private key, and comparing the information extracted from the decrypted digital signature with corresponding information transmitted by the sender. The symmetric key can then be used to encrypt the imagery and metadata for storage on the cloud (step 300).

Figure 3:
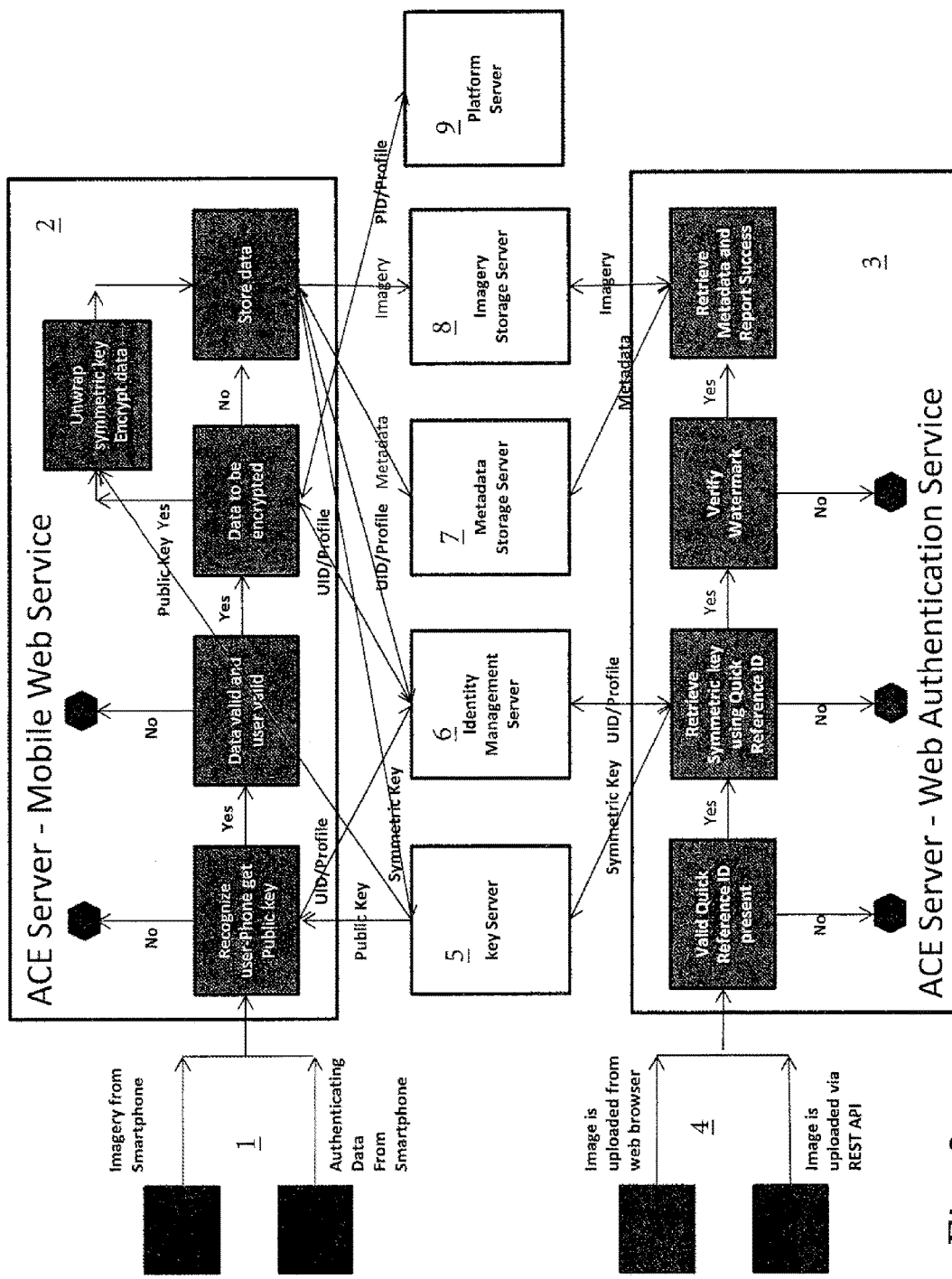
FIG. 3 illustrates a system for implementing the method of FIGS. 1 and 2.

FIG. 3 is a functional block diagram of a system for implementing the method of the invention. The system consists of a smartphone (or other camera device) 1 for capturing imagery and uploading the imagery and authenticating data, i.e., the watermarked imagery, digitally signed metadata and a symmetric key as described above, to a web service referred to as an authentication centric entity (ACE) that authenticates and stores the imagery and authenticating data from the smartphone 1. The authentication centric entity may be divided into a mobile web service 2 that receives the imagery and authenticating data from the smartphone 1 and carries out authentication and storage, and a web authentication service 3 that authenticates and validates images submitted by a third party 4 through the Internet or by other communication means, again using the above-described authentication and validation steps. The mobile web service 2 and web authentication service 3 are illustrated as two discrete entities, but may be a single entity or more than two discrete entities. Each of the services 2 and 3 may include, share, or utilize a key server 5, identity management server 6, metadata storage server 7, imagery storage server 8, and platform server 9 for carrying out various steps of the method as described above.

In particular, step 190 may include the following steps:

When an authenticating data package made up of the digitally signed watermarked imagery, metadata, and symmetric key is received from a registered smartphone or other image capture device, the authentication centric server:

retrieves the device username (sent in the inbound data in clear text;

uses the device username to retrieve the public key associated with the private key of the device user account;

uses the public key to confirm that the metadata digital signature and the imagery digital signature collected for the imaging action are valid;

retrieves the encrypted symmetric key from the authenticating data and stores it in the PKI and symmetric key server of the authentication centric entity;

retrieves from the device user account profile the identification of which data if any has been selected to be encrypted;

if the device user account identifies data to be encrypted, then the symmetric key sent in the authenticating data is retrieved and decrypted using the public key belonging to the device user account.

any portion of the metadata that is selected for encryption is encrypted with the symmetric key and stored in the a metadata storage device, server or database.

if the imagery is selected for encryption, it too is encrypted with the symmetric key and stored in a corresponding imagery storage device, server, or database.

finally, the watermarked imagery is sent to designated recipients or imagery disseminating websites such as Facebook, Twitter, LinkedIn, Pinterest and/or other such social media as directed by the registered account hold The authentication centric entity provides imagery characterization functions when requested by an interested party (in accordance with such authentication centric business practice as may be in place). Applicable to any imagery submitted to the authentication centric entity from any interested party, such functions may by way of example proceed as follows:

using the known quick reference number watermarking technique used on the smartphone, it is determined whether or not the submitted imagery contains a corresponding quick reference number; if not, the imagery is not a copy of any imagery resident in the authentication centric entity, and its validity cannot be authenticated;

if the submitted imagery contains a known quick reference number, then the device user account data, the imagery that it points to (the "master" imagery, if stored), and the authenticating data are looked up;

the public key in the master's authenticating data is used to attempt a signature extraction from the submitted imagery that matches the imagery digital signature of the master if an exact match with the original is requested. If a match occurs, the submitted imagery is an exact and untampered copy of the master.

the archived metadata of the master imagery (i.e., the metadata concerning the image itself, such as Exif-like metadata, is compared with the metadata data available on the submitted imagery, if any, to determine tampering of this information;

for an exact match operation, if a digital signature match does not occur, then it is known that the submitted imagery has been modified with respect to the master;

for non-exact matches, the unique random identifier which was used to robustly watermark the master imagery is then used to find tell-tail watermarking, if any, throughout the submitted imagery; a comparison of the two images with regard to the presence or absence of watermarked regions in the submitted imagery will reveal such modifications as: whether the submitted imagery is a mere scaling of the master, whether it is a cropping of the master (along with an ID of what has been cropped), or whether it is a substantively damaging version of the master;

metadata, which goes beyond the Exif-like data is available for an extended understanding of the circumstances surrounding the capture of the master imagery;

stored imagery is retrieved for registered account holders for ready authentication by the authentication centric entity as a service for external business purposes, social purposes, legal purposes and other human purposes of all types.

Finally, the above-described method of the invention, and corresponding system and processor-implemented software, may be used for a variety of particular applications or businesses, as described in the parent provisional application, such as:

Safedate: This application would offer women a means of cell-phone-camera based deterrence to physical attack or abuse when out on a date with, or when meeting with, any individual for whom she may wish added assurance. Safedate exploits the validation of cell phone imagery by employing it to enable the woman to snap a picture of the individual in question when they meet up or head out, which picture is then instantly transmitted to Safedate's server for protected storage and irrefutable evidence that the two were together at the place and time the picture was snapped. Deterrence arises from the individual's full knowledge (because she tells him when she snaps the picture), that his image has been captured and uploaded to Safedate as unimpeachable evidence of their placed, dated and timed togetherness. The photo is not only secured from his reach, it is also protected from misuse by her.

Meetsafe: This application would offer employees of companies such as real estate companies, improved security when meeting clients at remote locations. Meetsafe would enable the employee to snap a validated and authenticated image of the client when they first meet, clearly announcing to the client what has just happened with the photo. And again, as in Safedate, the photo is not only secured from the reach of the client, it is also protected from misuse by the employee.

Roadrage: This application would allow people to capture validated imagery and video of unwanted confrontations. Although given the name Roadrage for its description, this application would cover all manner of unwanted confrontation. Unfortunately, the deterrence value of some unwanted confrontations may be reduced owing to the existence of rationality-reducing rage in the offender. The evidentiary value of the validated and authenticated imagery and video in such circumstances remains intact under all circumstances.

Helpful Citizen: This application would enable bystanders to accident, catastrophe, riot, etc., to capture invaluable validated information for first responders and investigators, and provide organizational services to communities and agencies to implement the wide usage of this technology across their citizen base.

It will be understood that these applications are exemplary in nature and not intended to limit the application to a particular imagery authentication and validation context or application.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

We claim:

1. A method of authenticating and validating an image by an authentication centric entity, comprising the steps of:
   receiving from a digital image capture device a digitally signed watermarked still or video image, symmetric key, and metadata, wherein the metadata is in addition to the watermarked still or video image, and is information associated with the image capture, said information including at least one of the following:
   a time of capture of the image;
   a date of capture of the image;
   camera settings at the time of image capture;
   an orientation of the image capture device at the time of image capture;
   data concerning movement of the image capture device at the time of image capture;
   context information including sounds or words captured contemporaneously with the image;
   a direction in which the image is captured; and
   information concerning signals from nearby cell towers or WiFi hotspots;
   verifying, by a digital computing device, the authenticity of the watermarked image, symmetric key, and metadata by decrypting the digital signature;
   storing the watermarked image, symmetric key, and metadata in at least one data storage device;
   upon receiving a submitted image of unconfirmed authenticity from a sender, comparing the submitted image of unconfirmed authenticity with the previously-authenticated stored watermarked image;
   if the submitted image of unconfirmed authenticity matches the stored watermarked image or if differences between the submitted image of unconfirmed authenticity and the previously-authenticated stored watermarked images are acceptable differences, retrieving at least the stored metadata; and
   sending a notification to the sender of the submitted image of unconfirmed authenticity that the submitted image of unconfirmed authenticity is deemed to be at least potentially authentic and valid.

2. The method of authenticating and validating an image by an authentication centric entity as claimed in claim 1, further comprising the step of the authentication centric entity sending at least a portion of the retrieved metadata to the sender of the submitted image of unconfirmed authenticity for further analysis.

3. The method of authenticating and validating an image by an authentication centric entity as claimed in claim 1, wherein acceptable differences include scaling and cropping of the watermarked image.

4. The method of authenticating and validating an image by an authentication centric entity as claimed in claim 1, further comprising the step of retrieving the stored symmetric key to extract the unique identifier from the stored and submitted images.

5. The method of authenticating and validating an image by an authentication centric entity as claimed in claim 1, further comprising the step of carrying out additional authentication by comparing Exif-like metadata extracted from the submitted image with stored Exif-like metadata.

6. The method of authenticating and validating an image by an authentication centric entity as claimed in claim 1, further comprising the step of, following authentication of the digitally signed watermarked image received from the digital image capture device, forwarding the watermarked images to one or more designated recipients or websites.

7. The method of authenticating and validating an image by an authentication centric entity as claimed in claim 1, wherein the step of authenticating the digitally signed watermarked image is carried out by retrieving a public key and decrypting a digital signature that was encrypted by a private key stored on the digital image capture device and corresponding to the public key.

8. The method of authenticating and validating an image by an authentication centric entity as claimed in claim 1, further comprising the step of retrieving the stored watermarked image and corresponding metadata by extracting an image identifier from the submitted image.

9. The method of authenticating and validating an image by an authentication centric entity as claimed in claim 1, wherein the stored metadata includes data on a location at which the image was captured, a time when the image was captured, and additional information associated with the image capture.

10. An authentication centric entity including at least one server, the at least one server being connected to receive and authenticate digitally-signed watermarked images from any of a plurality of registered image capture devices, and to receive submitted image authentication and validation requests from users, the authentication centric entity including hardware and processor-executed software for carrying out the following steps:
receiving from a digital image capture device a digitally signed watermarked still or video image, symmetric key, and metadata, wherein the metadata is in addition to the watermarked still or video image, and is information associated with the image capture, said information including at least one of the following:
a time of capture of the image;
a date of capture of the image;
camera settings at the time of image capture;
an orientation of the image capture device at the time of image capture;
data concerning movement of the image capture device at the time of image capture;
context information including sounds or words captured contemporaneously with the image;
a direction in which the image is captured; and
information concerning signals from nearby cell towers or WiFi hotspots;
verifying, by a digital computing device, the authenticity of the watermarked image, symmetric key, and metadata by decrypting the digital signature;
storing the watermarked image, symmetric key, and metadata in at least one data storage device;
upon receiving a submitted image of unconfirmed authenticity from a sender, comparing the submitted image of unconfirmed authenticity with the previously-authenticated stored watermarked image;
if the submitted image of unconfirmed authenticity matches the stored watermarked image or if differences between the submitted image of unconfirmed authenticity and the previously-authenticated stored watermarked images are acceptable differences, retrieving at least the stored metadata; and
sending a notification to the sender of the submitted image of unconfirmed authenticity that the submitted image of unconfirmed authenticity is deemed to be at least potentially authentic and valid.

11. The authentication centric entity as claimed in claim 10, further comprising the step of the authentication centric entity sending at least a portion of the retrieved metadata to the sender of the submitted image of unconfirmed authenticity for further analysis.

12. The authentication centric entity as claimed in claim 10, wherein acceptable differences include scaling and cropping of the watermarked image.

13. The authentication centric entity as claimed in claim 10, further comprising the step of retrieving the stored symmetric key to extract the unique identifier from the stored and submitted images.

14. The authentication centric entity as claimed in claim 10, further comprising the step of, following authentication of the digitally signed watermarked image received from the digital image capture device, forwarding the watermarked images to one or more designated recipients or websites.

15. The authentication centric entity as claimed in claim 10, wherein the step of authenticating the digitally signed watermarked image is carried out by retrieving a public key and decrypting a digital signature that was encrypted by a private key stored on the digital image capture device and corresponding to the public key.

16. The authentication centric entity as claimed in claim 10, further comprising the step of retrieving the stored watermarked image and corresponding metadata by extracting an image identifier from the submitted image.

17. The authentication centric entity as claimed in claim 10, wherein the stored metadata includes data on a location at which the image was captured, a time when the image was captured, and additional information associated with the image capture.

* * * * *